US005378061A

United States Patent [19]

Christenson

[11] Patent Number: 5,378,061

[45] Date of Patent: Jan. 3, 1995

[54] CONCRETE MIXING DRUM FIN STRUCTURE

[75] Inventor: Ronald E. Christenson, Kasson, Minn.

[73] Assignee: McNeilus Truck and Manufacturing, Inc., Dodge Center, Minn.

[21] Appl. No.: 188,776

[22] Filed: Jan. 31, 1994

Related U.S. Application Data

[63] Continuation-in-part of Ser. No. 788,256, Nov. 5, 1991, abandoned.

[51] Int. Cl.$^{6}$ .......... B28L 5/20; F16B 5/02

[52] U.S. Cl. .......... 366/59; 366/227; 366/228; 403/28; 403/408.1

[58] Field of Search .......... 366/52, 54, 56, 57, 366/59, 227, 228, 279, 320, 339; 403/24, 28, 30, 404, 408.1, 337, 339, 340, 258, 260, 262; 198/659; 428/246; 264/274

[56] References Cited

U.S. PATENT DOCUMENTS

| | | | |
|---|---|---|---|
| 578,829 | 3/1897 | McTighe | 403/28 |
| 1,501,566 | 7/1924 | Landberg | 366/57 |
| 1,890,002 | 12/1932 | Davis | 366/57 |
| 3,795,121 | 3/1974 | Cressiyan | 366/59 |
| 4,507,011 | 3/1985 | Brown | 403/404 |
| 4,722,608 | 2/1988 | Salzman | 366/279 |
| 5,056,924 | 10/1991 | Christenson | 366/59 |
| 5,108,262 | 4/1992 | Crane | 416/241 R |
| 5,160,485 | 11/1992 | Jaillet | 428/246 |
| 5,178,457 | 1/1993 | Helmy | 366/59 |
| 5,228,795 | 7/1993 | Gray | 403/30 |

*Primary Examiner*—David A. Scherbel
*Assistant Examiner*—Terrance R. Till
*Attorney, Agent, or Firm*—Haugen and Nikolai

[57] ABSTRACT

An assembly which is adapted for mounting inside a mixing drum (18) and a mobile system for mixing and dispensing concrete includes a spiral fin assembly (36) for mixing and guiding a substance when the mixing drum (18) is rotated. The fin assembly (36) is constructed of a lightweight polymeric material which is resistant to abrasion, is many times lighter than steel, and tends to wear smooth rather than rough, which increases the cleanability of the fin structure over its entire design life. Novel structure for securing the fin assembly (36) to an outer wall (38) of the mixing drum (18), novel structure of fin assembly (36), and novel structure for connection of adjacent fin sections are disclosed.

1 Claim, 7 Drawing Sheets

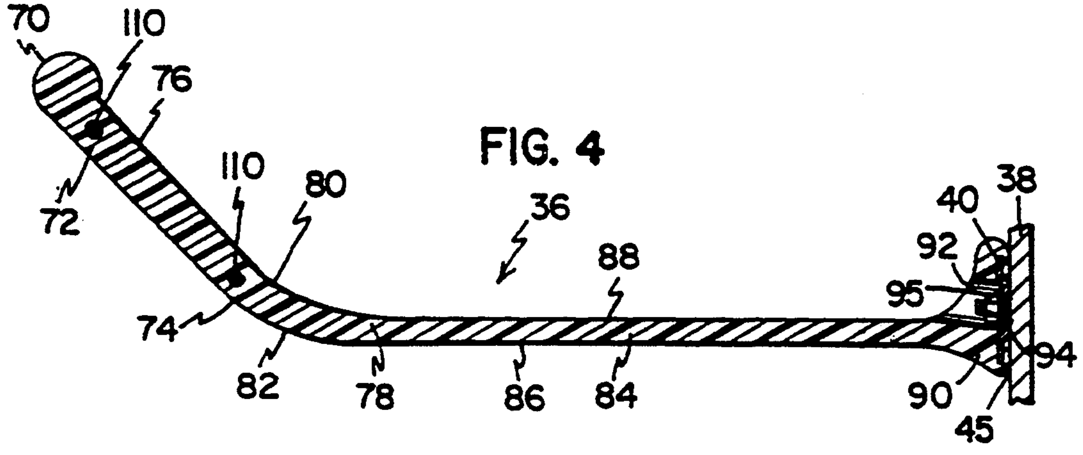
FIG. 4
FIG.6
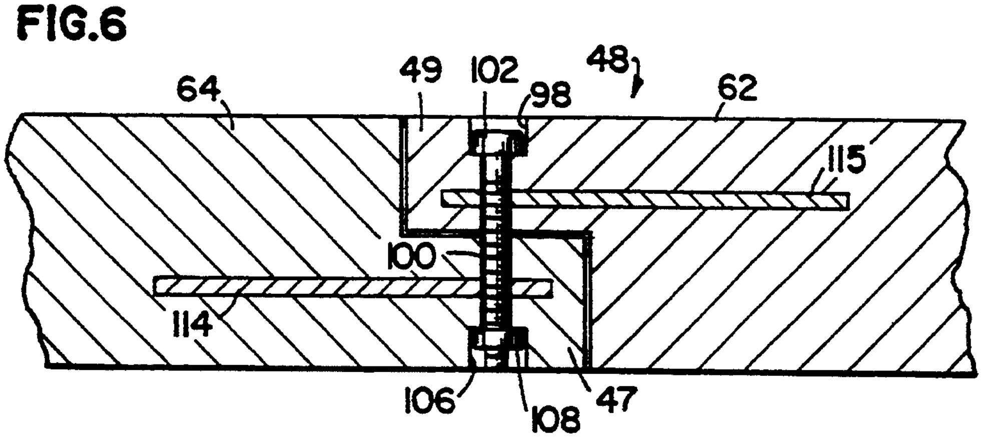
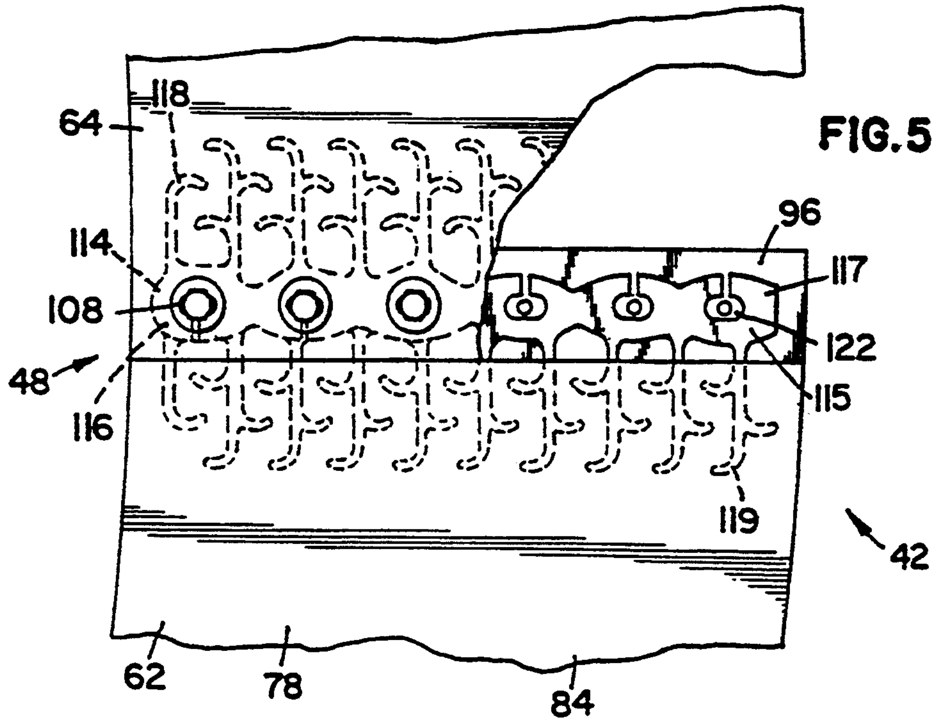
FIG.5

FIG. 9
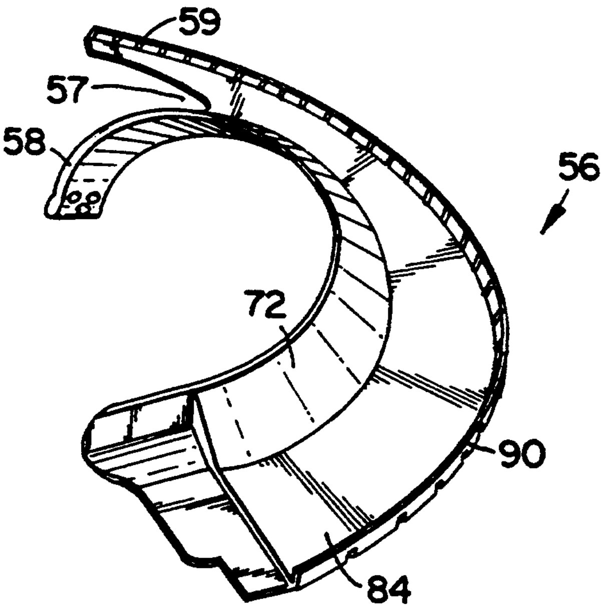
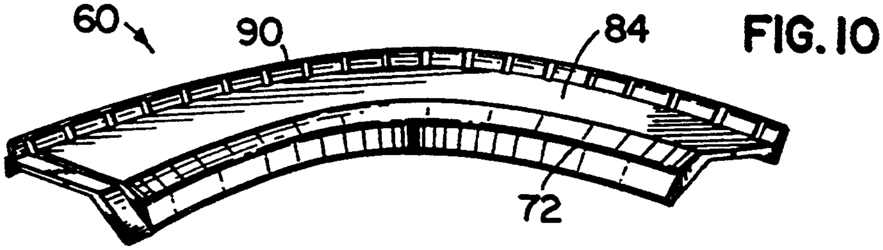
FIG. 10
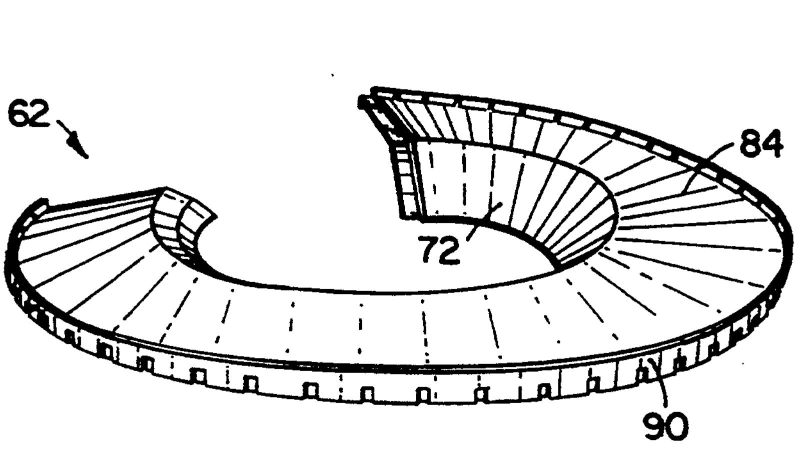
FIG. 11

FIG. 12
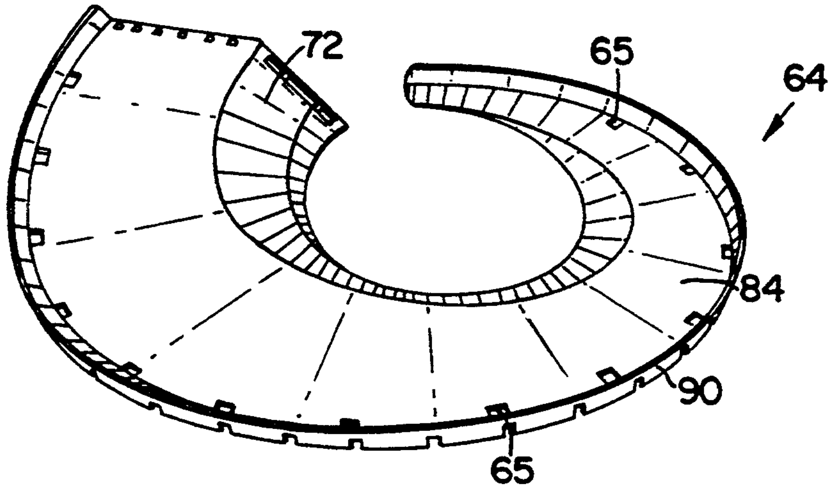
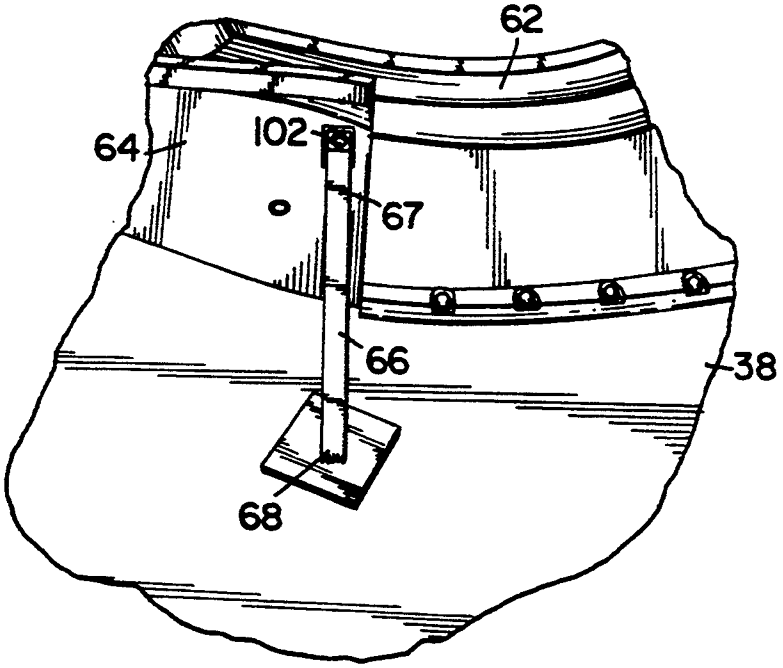
FIG. 13

CONCRETE MIXING DRUM FIN STRUCTURE

CROSS-REFERENCE TO RELATED APPLICATIONS

This is a continuation-in-part application of application Ser. No. 07/788,256 filed Nov. 5, 1991 (now abandoned).

FIELD OF THE INVENTION

This invention relates to mobile systems for mixing and dispensing concrete. More specifically, this invention relates to an improved fin structure for use within the mixing drums in such systems which will increase the efficiency of a system, as well as lowering maintenance and manufacturing costs.

BACKGROUND OF THE INVENTION

Concrete mixing trucks are widely used in the construction industry for preparing and transporting a concrete mixture to a desired construction site. A mixing truck typically includes a rotatable mixing drum which has metallic fins or agitators mounted inside for mixing and directing the movement of a concrete mixture therein. Ordinarily, such fins have a helical configuration which will tend to mix concrete when the mixing drum is rotated in a first direction, and urge the concrete toward a discharge chute when the mixing drum is turned in an opposite direction.

During operation of such trucks, a great deal of abrasive friction is generated between the mixing fins and the various abrasive components of the concrete mixture which is being transported. As a result, mixing fins typically wear out long before the outer wall of the mixing drum itself does. Accordingly, a mixing drum must either be discarded or rebuilt with new fins if it is to achieve the full extent of its own design life. Such refitting is commonly done throughout the industry, and it is a relatively expensive, time-consuming process. Another problem with metallic fins is their tendency to oxidize or corrode, which makes them difficult to clean after use. As a result, concrete often builds up on the fins after each use. This reduces the usable volume of the drum and the efficiency of the fins during use. It also compounds the difficulty of cleaning the inside of the drum and the fins as time goes on. Structural problems have also occurred in the fin to drum wall connections, and in the connection of fin sections together because of various stress forces which are applied at these points when the mixing drum is in operation.

Despite the above-noted problems, trucks with metallic mixing fins have been designed to operate fairly well in the past. However, it is generally recognized that the efficiency of a mixing system as a whole will be enhanced if such problems could be ameliorated. Therefore, there has existed a long and unfilled need for mixing fins which have greater resistance to abrasion, which do not become roughened as they wear, which are more lightweight than mixing fins which have been heretofore known, have better connections to the drum wall and have better fin to fin connections.

SUMMARY OF THE INVENTION

An assembly according to the invention is adapted for mounting inside a mixing space which is defined by an outer wall of a mixing drum in a mobile system for mixing and dispensing a mixture such as concrete. The assembly includes a spiral fin assembly extending transversely into the mixing space for mixing and guiding the concrete within the mixing space when the mixing drum is rotated. The fin assembly is constructed of a lightweight, resilient, polymeric material which is flexible and resistant to abrasion, preferably comprising a polyurethane and polyethylene blend. The fin assembly has a flexible fin portion subject to a maximum deflection during mixing of the concrete. The fin assembly includes at least one continuous fibrous rope disposed within the flexible fin portion for providing improved strength and wear resistance to the fin. The fin assembly will flex during operation to cause any dried concrete adhering thereto to flick off.

The assembly also includes improved structure for securing the fin structure to the wall of a mixing drum, as well as improved fin to fin connections. The fin assembly comprises at least one pair of fin sections, with each fin section having a connector plate embedded therein which extends transversely along a first longitudinal end. The connector plate comprises a plurality of transversely spaced anchor members defining a plurality of apertures therein, and a plurality of transversely spaced, longitudinally extending hook members extending from the anchor members toward a second longitudinal end. The fin sections are connected together with a joining means such as a nut and bolt connection extending through the apertures in the connector plates of adjoining fin sections. The fin assembly is secured to the mixing drum by a plurality of metal inserts having a plurality of spaced apertures therein which are embedded within a base portion of the fin assembly. The metal inserts are connected to the mixing drum with a securing means such as bolts which extend through the metal insert apertures in the base portion which has a plurality of access bores therethrough for exposing the apertures in the metal inserts. The locations and spacing of the access bores are such that the base portion is held in tight, intimate contact with the inside wall surface of the drum to prevent ingress of concrete material therebetween as the fin is flexed during use.

According to a second aspect of the invention, a mobile system for mixing and dispensing a mixture such as concrete may include a vehicle and a mixing drum, in conjunction with the assembly that is discussed above.

Accordingly, it is an object of this invention to provide a spiral fin assembly for use in a mixing system which is more resistant to abrasion and corrosion than mixing fins which are currently in use.

It is further an object of the invention to provide an improved mixing fin which will tend to remain smooth as it is subjected to wear.

It is further an object of the invention to provide a mixing fin which is lighter in weight, with improved strength and flexibility over those heretofore known.

It is further an object of the invention to provide a mixing fin having improved fin to drum wall connections and improved fin to fin connections.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 4 is a cross-sectional view of the fin structure taken along lines 4—4 in FIG. 3.

FIG. 5 is an enlarged fragmentary plan view of a portion of the fin structure shown in FIG. 3.

FIG. 6 is a cross-sectional view taken along lines 6—6 in FIG. 3.

FIG. 9 is an elevational perspective view of a head cone fin section for use in the mobile system of FIG. 1.

FIG. 10 is an elevational perspective view of a crossover or belly fin section for use in the mobile system of FIG. 1.

FIG. 11 is an elevational perspective view of a big cone fin section for use in the mobile system of FIG. 1.

FIG. 12 is an elevational perspective view of a tail cone fin section for use in the mobile system of FIG. 1.

FIG. 13 is an enlarged fragmentary perspective view of the inside of a mixing drum according to a preferred embodiment of the invention.

DETAILED DESCRIPTION OF THE INVENTION

Figure 1:
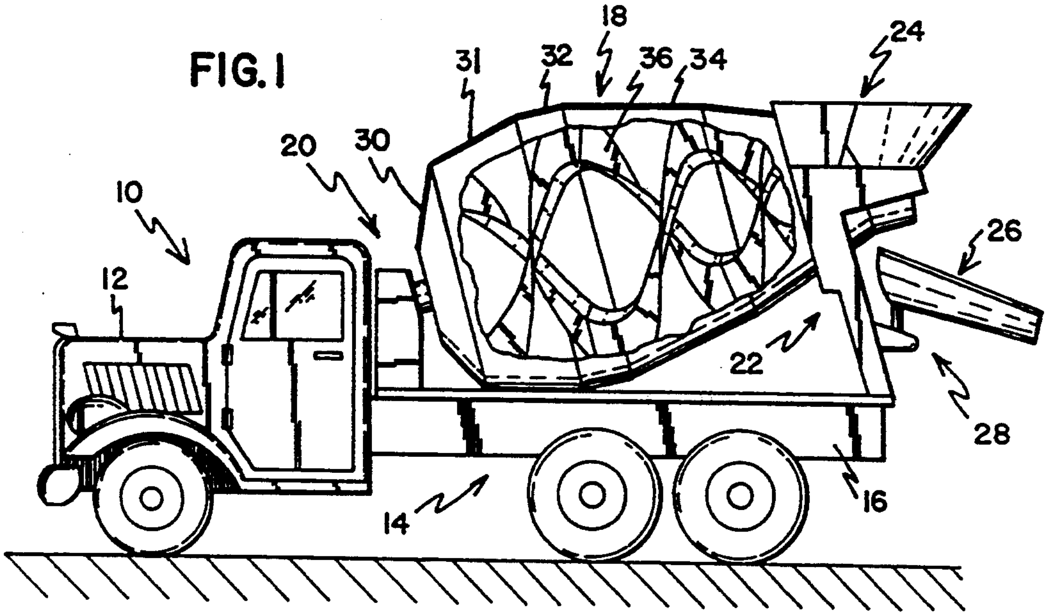
FIG. 1 is a side elevational view of a mobile system for mixing and dispensing concrete according to a preferred embodiment of the invention.

Referring now to the drawings, wherein like reference numerals designate corresponding structure throughout the views, and referring in particular to FIG. 1, a mixing truck 10 constructed according to a first preferred embodiment of the invention includes a cab portion 12 and a rear portion 14 which has a main frame 16. A mixing drum 18 is mounted for rotation on a front support frame 20 and rear support frame 22, both of which are integral with main frame 16. A rearward portion of mixing drum 18 is positioned adjacent a discharge mechanism 24 which includes a funnel for loading concrete components into mixing drum 18, as well as a portion for guiding mixed concrete into a main chute 26, as is well known in the art. Main chute 26 is supported relative to rear support frame 22 by a pivot joint 28, which enables main chute 26 to be positioned over a set of forms or other desired location for the mixed concrete. It will be appreciated by those skilled in the art that the other various details of the truck 10, including but not limited to the engine, drive train and hydraulic system for operating mixing drum 18, are well known and readily available to the skilled artisan.

Figure 2:
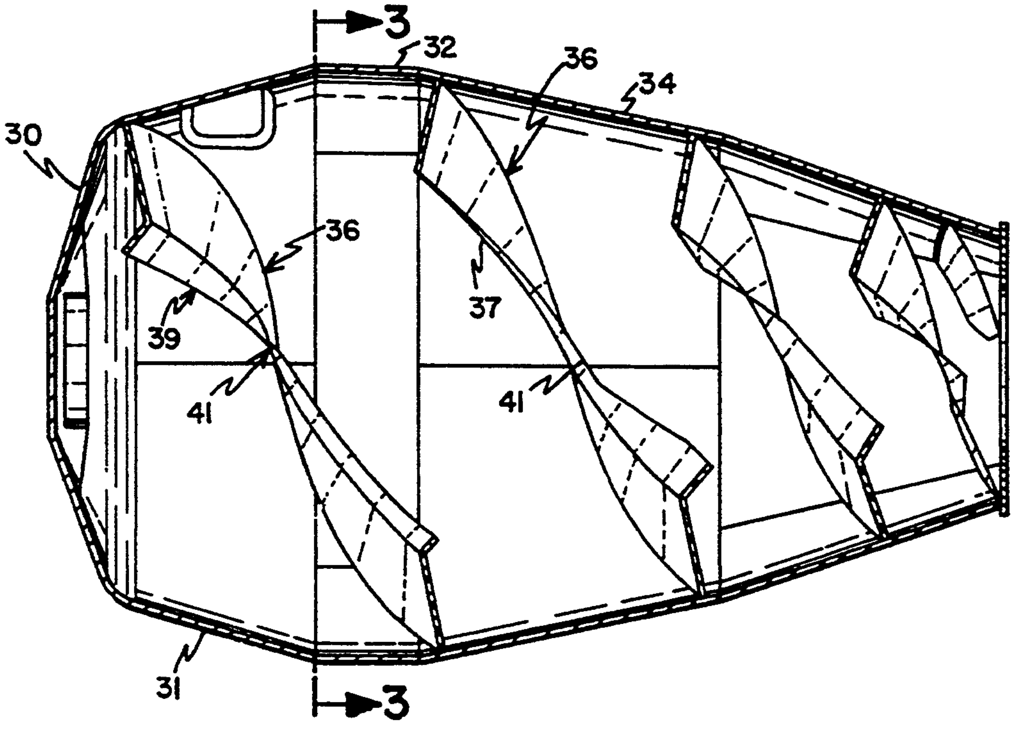
FIG. 2 is a fragmentary elevational view of a mixing drum of the mixing system illustrated in FIG. 1.

As may be seen in FIGS. 1 and 2, mixing drum 18 includes a head cone portion 30, a belly or crossover portion 31, a big cone portion 32, and a rear tail cone portion 34 which terminates at the end of truck 10 which supports the discharge mechanism 24. An improved helical or spiral mixing fin assembly 36 is mounted to an inner surface of an outer wall 38 and extends transversely into the mixing space of mixing drum 18, as will be described in greater detail below. The mixing drum 18 can be formed in varying sizes, preferably having a volume from 9 to 11 cubic yards.

FIGS. 9–12 depict the various fin sections of fin assembly 36 before they are attached together and secured inside of mixing drum 18. The fin sections include in the order of attachment, a head cone fin section 56 (FIG. 9), a belly cone fin section 60 (FIG. 10), a big cone fin section 62 (FIG. 11), and a tail cone fin section 64 (FIG. 12). As depicted in FIG. 9, the head cone fin section 56 preferably has a split 57 along a portion of one longitudinal end thereof forming two opposing leg members 58 and 59. The belly cone fin section 60 can be made to various sizes depending upon the size of the mixing drum employed. Typical mixing drums come in volumetric sizes of 9, 9½, 10, 10½, and 11 cubic yards, so the size of the belly cone fin section will vary accordingly. The various fin section dimensions are generally as follows: The head cone fin section 56 has a curved longitudinal length from about 90 inches to 140 inches, and a transverse width from about 15 to 25 inches; the belly fin section 60 has a curved longitudinal length from about 45 inches to 105 inches, and a transverse width from about 17 to 25 inches; the big cone fin section 62 has a curved longitudinal length from about 90 inches to 220 inches, and a transverse width from about 20 to 30 inches; and the tail cone fin section 64 has a curved longitudinal length from about 65 inches to 170 inches, and a transverse width from about 1 to 35 inches. As seen in FIG. 12, the tail cone fin section 64 preferably has a plurality of washout holes 65. The washout holes 65 are particularly advantageous when the interior of mixing drum 18 is rinsed out after use.

As may be seen in FIG. 2, fin assembly 36 includes a first rearwardly curving fin segment 37, a second forwardly curving fin segment 39, and a transitional fin portion 41 which connects the rearwardly curving segment 37 and the forwardly curving segment 39. Each fin segment 37 and 39 is made up of the four fin sections 56, 60, 62 and 64 as described above. It will be appreciated that a concrete mixture will be agitated by the fin segments 37, 39, and 41 when mixing drum 18 is caused to rotate in a first direction, while the fin segments will urge the mixture toward discharge mechanism 24 when the mixing drum 18 is rotated in a second, opposite direction. The forwardly curving fin segment 39 acts to help lift and toss the mixture toward the middle of drum 18 when drum 18 is rotated to mix the material.

The various sections of spiral fin assembly 36 are secured to the outer wall 38 of mixing drum 18 by using a metal insert 40, in a manner that will be described below in further detail with reference to FIGS. 4 and 7. As may be seen in FIG. 3, fin assembly 36 includes a flexible fin portion 42 transversely extending from a base portion 90, with fin portion 42 being subject to a maximum deflection.

Preferably, the fin sections are fabricated from a thermoset polymeric material which is relatively lightweight, resilient and which will tend to remain smooth after wear. The most preferred polymeric composition is a polyurethane based polymer blended with a filler material. The filler material is preferably a polyethylene material such as PRIMAX TM UH-1000 Series Particles (Air Products and Chemicals, Inc.) which is based on ultrahigh molecular weight polyethylene resin. The filler material provides for increased wear resistance, increased tear resistance, a lower coefficient of friction, and increased stiffness and hardness (Shore D) of the polymeric composition. The polymeric material used in making the fin sections preferably comprises a polyurethane and polyethylene blend which has about 70 to 95 wt-%, preferably about 80 to 90 wt-% of polyurethane, and about 30 to 5 wt-%, preferably about 20 to 10 wt-% of polyethylene. It is to be understood that the polyurethane component can contain a curing agent and minor amounts of other components such as chain extenders, catalysts, pigments, etc. Test data on the preferred polymeric material will be discussed in greater detail below. The polymeric material used to form the plastic fin sections can also have other filler materials such as various reinforcing fibers. Nonlimiting examples of such fibers include glass fibers, carbon fibers, metallic fibers, polymeric fibers such as aramid fibers, coated fibers, etc. It is important that the outer surfaces of the fin sections be smooth, so as to facilitate efficient removal of concrete from the fins after use.

The various fin sections of fin assembly 36 can be made in a typical molding operation such as by cast molding or reaction -injection molding (RIM). In the molding operation, the fin sections are formed by rapid injection of two metered liquid streams, one stream containing a polyurethane prepolymer (polyol and isocyanate) blended with the filler material such as polyethylene, and the other stream containing a typical curing agent. These two streams are mixed and poured into the mold to form the mixing fin. Alternatively, a third stream containing the filler material can be used to mix the filler material with two other streams containing the prepolymer and curing agent before they enter a mold. The curing agent is employed to provide cross-linking of the polymers. Once the molding has occurred, the fin section is placed in an oven to cure the polymeric material which causes final cross-linking to take place.

Figure 8:
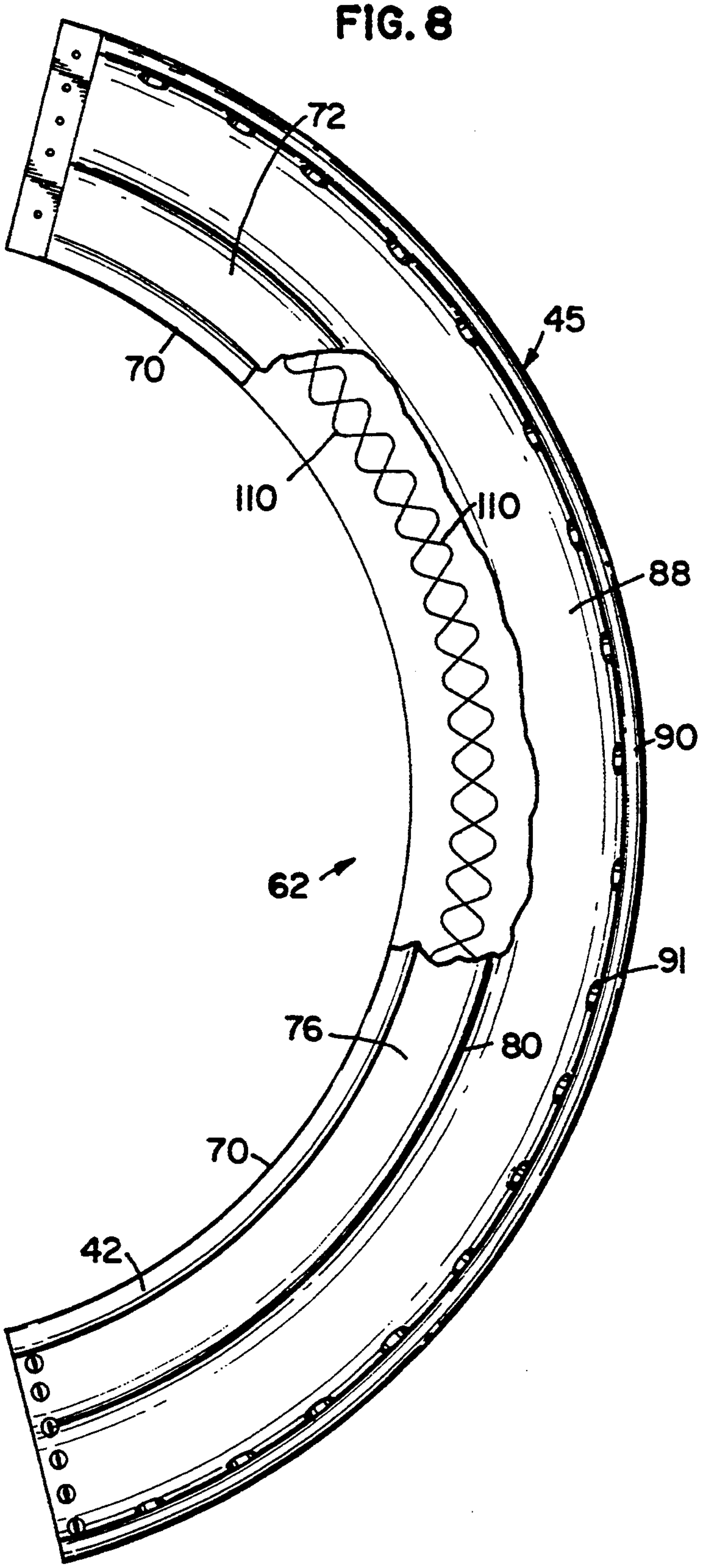
FIG. 8 is an enlarged cutaway view of a fin section shown in FIG. 3.

Turning to FIG. 8, a preferred embodiment of fin section 62 has a fibrous rope 110 disposed therein in flexible fin portion 42. The fibrous rope 110 is preferably employed in distal portion 72 and preferably is configured and arranged to form a continuous overlapping sinusoidal pattern of the type: XXXXX in fin section 62. The fibrous rope 110 is preferably made of polymeric fibers, with aramid fibers being the most preferred. Kevlar ® aramid fibers from DuPont can be used in the fibrous rope 110 employed in fin section 62. The fibrous rope 110 is preferably employed in fin section 62 by using nylon bushings (not shown) which are deployed at each end of a fin section mold. A continuous length of fibrous rope is then knitted between the nylon bushings in a zig zag pattern to form the above overlapping sinusoidal pattern prior to molding fin section 62. It is to be understood that all fin sections can employ the fibrous rope 110 as described above. The fibrous rope 110 employed herein provides increased strength to the flexible fin portion 42 and distributes stress forces which occur when the fin assembly 36 comes into contact with concrete. The fibrous rope 110 also provides excellent wear resistance and tear resistance to fin assembly 36.

Figure 7:
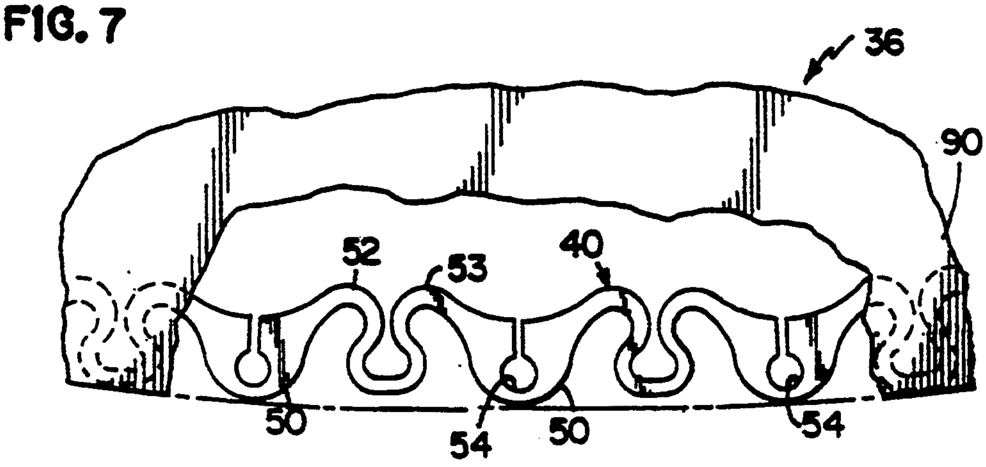
FIG. 7 is an enlarged cutaway view illustrating a portion of the fin structure shown in FIG. 3.

Looking now to FIG. 7, a first preferred embodiment of metal insert 40 in base portion 90 for connecting fin assembly 36 to mixing drum 18 includes a number of substantially flat anchor sections 50 having a plurality of spaced apertures 54 therein. Each of the anchor sections 50 are flexibly connected to adjacent anchor sections via flexible connecting hoop sections 52 and 53. The flexible hoop sections 52 and 53 are unitary with anchor sections 50 and provide improved strength and flexibility of the fin to drum wall connection discussed below. The flexible sections also permit longitudinal expansion and contraction of the metal insert 40 between the anchor section 50 so that the metal insert 40 can adjust to expansion and contraction of the polymeric material used in making the fin sections during manufacturing. The metal insert 40 is formed of a resilient metallic material such as steel. It is to be understood that a plurality of metal inserts 40 are employed along the fin edges in base portion 90 where fin to drum wall connection is desired. The metal insert 40 is completely embedded in base portion 90 and only aperture 54 is exposed to allow attachment of the fin section to the outer wall 38 as described in greater detail below.

Figure 3:
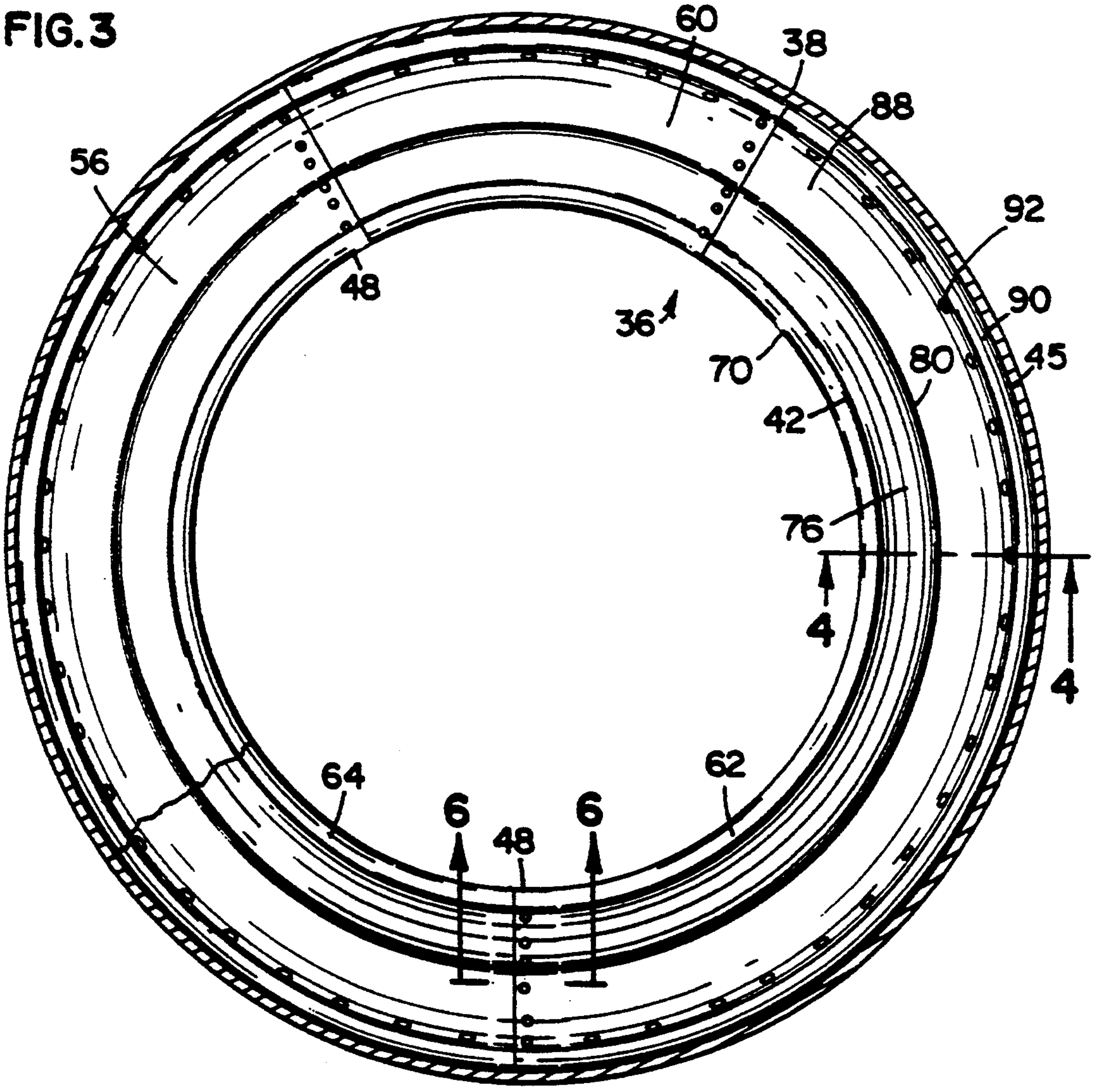
FIG. 3 is a cross-sectional view taken along lines 3—3 in FIG. 2.

As may be seen in FIG. 3, the fin sections are joined together by a number of fin connection joints 48, one of which is shown in cross-section in FIG. 6 and will be described in greater detail below. As seen in FIG. 3, fin assembly 36 includes an inner edge 70 which defines an orifice through which material such as concrete may pass and an outer edge 45 next to outer wall 38. As may be seen in FIG. 4, fin assembly 36 includes in transverse cross-section, the base portion 90 proximate the outer edge 45, a substantially straight central blade portion 84 extending from base portion 90, and a distal portion 72 extending at an obtuse angle from blade portion 84, with distal portion 72 defined by a first outer surface 74 and a first inside surface 76. The flexible fin portion 42 discussed above includes the blade portion 84 and the distal portion 72. Unitary with distal portion 72 is a bend portion 78 which is defined by a radiused inside surface 80 and a radiused outer surface 82. Blade portion 84 is unitary with bend portion 78, and is defined by a second outer surface 86 and a second inside surface 88. Base portion 90 is molded about the metal insert 40 discussed above with reference to FIG. 7. The base portion 90 has an access bore 92 which overlies aperture 54 in metal insert 40. Base portion 90 is attached to outer wall 38 via a plurality of bolts such as a nut and bolt connection 94, 95 through aperture 54 of metal insert 40 and bore 92. The bolt 94 can be attached to outer wall 38 by a weld and base portion 90 is secured to outer wall 38 by tightening of nut 95.

Looking now to FIG. 6, the construction of a fin connection joint 48 will now be described. As is shown in FIG. 6, fin section 64 and fin section 62 have matching step portions 47 and 49 defined therein for interconnecting the fin sections. Fin section 62 has a countersunk recess 98 defined in an outside surface of step portion 49 for receiving the head 102 of a bolt 100. Bolt 100 passes through a bore defined in fin section 62 and a matching bore in fin section 64. A countersunk recess 106 is defined in an outside surface of step portion 47 in fin section 64 for receiving a nut 108 which threadedly engages bolt 100 so as to secure together fin section 64 and fin section 62. The advantage provided by countersunk recesses 98 and 106 is that a concrete mixture is less likely to adhere to head 102 and nut 108.

Looking at FIGS. 5 and 6, fin sections 64 and 62 each have bolt connector plates 114 and 115 embedded respectively therein extending transversely along a first longitudinal end in each fin section. The connector plates 114 and 115 comprise a plurality of transversely spaced anchor members 116 and 117 which define a plurality of apertures 122 therein which overly the bores in fin sections 64 and 62 and through which bolt 100 extends when fin sections 64 and 62 are connected. A plurality of transversely spaced, longitudinally extending hook members 118 and 119 extend from anchor members 116 and 117 respectively toward a second longitudinal end of each fin section. The connector plates 114 and 115 are preferably made of a resilient metallic material such as steel and are molded in the fin sections during the molding operation employed in making the fin sections. The connector plates 114 and 115 provide for increased strength and flexibility of connection joint 48, and prevent sheer forces from pulling the fin sections apart when the fin assembly 36 is in operation.

In a preferred embodiment depicted in FIG. 13, a support brace 66 has a first end 67 attached to one of the bolts 100 that connect the fin section 64 and 62 together, with a second end 68 permanently attached to the inner surface of outer wall 38 of mixing drum 18 by any suitable means such as with a weld. The support brace 66 is preferably used on the connection joints 48 joining the big cone fin section 62 and the belly cone fin section 60, and joining the belly cone fin section 60 and the head cone fin section 56. The support brace 66 controls the flexibility of the connection joints 48 to prevent the joints from overflexing when the mixing drum 18 is in operation.

With reference again to FIG. 4, should flexure of the fin assembly 36 during use cause the outer edge 45 of the base portion 90 to lift away from the drum wall 38, it could lead to a buildup of sand, rock and concrete beneath the rear end 45 and the drum wall 38. To obviate this problem, the base portion 90 may be modified in the manner illustrated in FIG. 14. Here the base portion 90 is made somewhat symmetrical relative to the projecting central blade portion 84 and a further access board 92' is formed in it for receiving a nut 95' which is adapted to be threaded onto a bolt stud 94' welded to the drum wall 38 and passing through an aperture formed in the metal insert 40. When a nut driver is used to tighten down both of the nuts 95 and 95', the base portion 90 is tightly and intimately affixed to the drum wall 38, preventing the base portion 90 from lifting away from the drum wall when the central portion 84 of the fin assembly 36 is flexed. Hence, ingress of sand, stone and cement between the base portion 90 of the fin assembly 36 and the mixer wall 38 is prevented.

Figure 14:
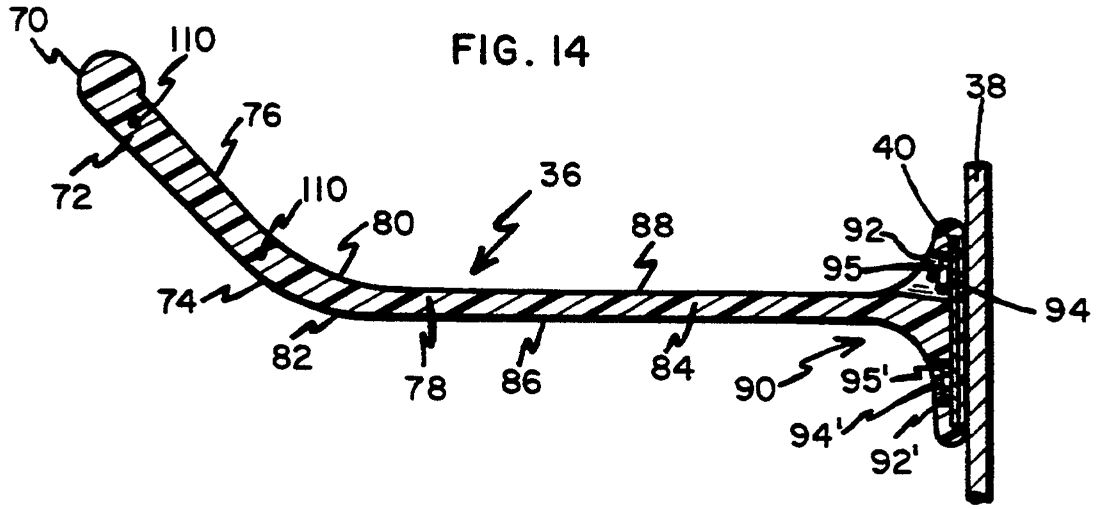
FIG. 14 is an enlarged cross-sectional view similar to that of FIG. 4, but illustrating a modified fin base portion in accordance with an alternative embodiment.

The modified fin assembly of FIG. 14 is also preferably formed in a molding operation. It has been found that by using a three-piece mold with one segment defining the first and second outer surfaces 74 and 86, a second segment defining the inside surface 80 and a third segment defining the bottom of the base portion 90, following the molding operation, the three segments can be separated, freeing the molded fin from the mold itself and allowing the mold to be reused.

An alternative way of securing both sides of the base portion of the fin assembly to the inner surface of the drum wall is to use a slotted bore extending inward from one edge of the base where the slotted bore also provides access to a correspondingly slotted aperture formed in the metal insert 40. Using this approach, the heel of the base portion can be slipped around a welded stud bolt projecting inwardly from the drum with the toe of the base portion having a circular bore communicating with a circular aperture in the reinforcing plate so that it can receive a similar threaded stud welded through the drum therethrough. By tightening down nuts on the studs, the base portion of the fin assembly is held in tight engagement with the adjacent drum surface even when the blade portion 84 thereof is flexed during use.

In operation, the flexible plastic mixing fin according to the invention has a smooth, slippery surface which prevents concrete from adhering to the fin and forming hardened buildup deposits. Also, since the polymeric material has good wearability and strength characteristics relative to its weight, it is possible to make the mixing fins thick enough to outwear the outer wall 38 of mixing drum 18, while weighing less than metallic mixing fins which were heretofore used. A further advantage to the plastic mixing fins according to the invention is that they can be easily molded to any shape and thickness. This allows them to be molded thicker at points where greater strength and stiffness are needed, at less expense than would be required to similarly form metallic blades.

The following Examples further illustrate the present invention and include testing of the preferred polymeric composition used in making the fin assembly of the invention.

EXAMPLES 1and 2

The polymeric material of Example 1 (modified polyurethane having 20% polyethylene as filler) and Example 2 (modified polyurethane having 10% polyethylene as filler) were prepared by mixing the components in a typical molding operation as described above. Table I shows the final components and amounts.

TABLE I

| Ingredient | Wt-% of Ingredient Example 1 | Example 2 |
|---|---|---|
| Polyurethane | 80 | 90 |
| Polyethylene (Ultra High Molecular Weight) | 20 | 10 |
| TOTAL | 100 | 100 |

Various physical properties and characteristics of the composition of Example 1 are summarized in Table II below which were determined by standard ASTM test methods to obtain the data.

TABLE II

| Properties of Example 1 | |
|---|---|
| Flexural Modulus → | 35,000–40,000 Psia. |
| Wear Resistance → | 90:100% with respect to AR Steel |
| Izod Impact → | 25–35 ft-lbs/inch |
| Shore Hardness → | 55–58 D |
| Specific Gravity → | 1.10–1.15 |
| Elongation → | 150–200% |

Examples 1 and 2 were tested for their wear resistance in accordance with the paddle wheel test protocol set forth below. Paddle wheel test wear resistance is a measure of the resistance of a material to the physical and chemical erosive effects of a flow of a concrete mixture against the material. This test has an accuracy of about plus or minus 10 percent. The data obtained in the paddle test is listed in Table III below. The testing period of each sample was two weeks. Four separate areas (a, b, c, d) were measured for their wear (loss in thickness) in the test samples, as indicated it, Table III below.

Paddle Wheel Test For Assessing Relative Wear Resistance

Protocol

1. Form a 1⅞" wide by 2⅞" long production sheet sample of the material to be tested and securely attach the sample to the distal end of a first rotatable radial arm which is positioned to rotate within the chamber defined by a receptacle.
2. Form an identically dimensioned production sheet sample of a reference material against which the tested material is to be compared (generally AR 200 steel) and securely attached the sample to the distal end of a second rotatable radial arm which is similarly positioned within the chamber defined by the receptacle.
3. Attach a removable protective layer of material, such as steel, proximate the center of the test sample and reference sample for purposes of preventing wear to that portion of the sample.
4. Accurately measure the thickness of the samples within an area located about ⅜" in from the side of the sample and about 2¼" up from the bottom of the sample.
5. Fill the receptacle with a mixture of granite chips, sand, and water so that the rotated samples of test and reference materials will be totally immersed within and forced through the mixture for at least a portion of the circular trajectory of the rotated samples.
6. Rotate the samples through the mixture by means of an electric motor.
7. Rotate the position of the samples from arm to arm i every 24 hours during short duration tests and every 48 hours during long duration tests so as to provide each sample with the same amount of time at each arm.
8. Collect the samples after the desired testing period and measure the thickness of the samples at the same locations as when the thickness was originally measured.
9. Compare and record the final measured thickness for each location on the samples with the original thickness at that location. Relate the comparative differences obtained as between the test and reference samples.

TABLE III

| Area | Paddle Wheel Test Data T[1] (Initial) | T (Final) | ΔT (Inch) |
|---|---|---|---|
| Example 1 - Modified Polyurethane (having 20% polyethylene as filler) | | | |
| a | .50715 | .49995 | −.00720 |
| b | .50765 | .50040 | −.00725 |
| c | .50710 | .50235 | −.00475 |
| d | .50655 | .50190 | −.00465 |
| | | TOTAL | −.02385 |
| Example 2 - Modified Polyurethane (having 10% polyethylene as filler) | | | |
| a | .50170 | .49420 | −.00750 |
| b | .50110 | .49350 | −.00760 |
| c | .50100 | .49685 | −.00415 |
| d | .50145 | .49710 | −.00435 |
| | | TOTAL | −.02360 |
| AR 200 Steel (Reference) | | | |
| a | .16245 | .15585 | −.00660 |
| b | .16025 | .15505 | −.00520 |
| c | .16375 | .15930 | −.00472 |
| d | .16390 | .15905 | −.00485 |

TABLE III-continued

| Area | Paddle Wheel Test Data T[1] (Initial) | T (Final) | ΔT (Inch) |
|---|---|---|---|
| | | TOTAL | −.02137 |

[1]T = top portion (wear measurement area)
2 - ΔT = T(final) − T(initial)

From the data in Table III, it was established that the wear resistance of the composition of Example 1 was about 90% and the wear resistance of the composition of Example 2 was about 90.5% of the wear resistance of abrasion resistant (AR 200) steel in resistance to the physical and chemical erosive effects of a flow of a concrete mixture.

EXAMPLE 3

A plastic spiral fin assembly according to the present invention was placed and secured inside a mixing drum along with a metal spiral fin assembly so that the mixing drum had a combination of both plastic fin sections and metal fin sections inside it. The mixing drum was then continuously rotated for a period of about six months while containing a charge of granite rocks. The thickness of the plastic fin and metal fin sections were measured every week and the granite rocks were also replaced every week. After six months, the steel fin sections were badly worn and needed to be replaced, whereas the plastic fin sections had only lost about 10% of their original thickness. From this test it was determined that a plastic fin according to the present invention will outlast three sets of steel fins in normal operation.

It is understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicate~ by the broad general meaning of the terms in which the appended claims are expressed.

What is claimed:

1. An assembly which is adapted for mounting within a mixing space defined by a mixing drum of the type used in a mobile system for mixing and dispensing concrete, comprising:

(a) a spiral fin assembly extending transversely into the mixing space for mixing and guiding the concrete within the mixing space when the mixing drum is rotated, said fin assembly being constructed of a lightweight polymeric material which is flexible and resistant to abrasion, said fin assembly comprising a base portion, a central blade portion extending transversely inward from said base portion, and a distal portion angularly extending inwardly from said blade portion, said fin assembly comprising:

(i) at least one pair of fin sections with each fin section having a connector plate embedded therein extending transversely along a first longitudinal end thereof, the connector plate comprising a plurality of transversely spaced anchor members defining a plurality of apertures therein, and a plurality of transversely spaced, longitudinally extending hook members extending from said anchor members toward a second longitudinal end; and (ii) means for joining said fin sections extending through said apertures; and (b) means for securing said fin assembly to said mixing drum comprising a plurality of metal inserts having a plurality of spaced apertures therein which are disposed within said base portion, wherein said base portion has a plurality of access bores therethrough for exposing said apertures in the metal inserts, said means for connecting comprises a plurality of bolts which extend through said access bores in said base portion and through said apertures in said metal insert and wherein said plurality of spaced apertures and said plurality of access bores are disposed on opposite sides of said central blade portion of said fin assembly for receiving said plurality of bolts therethrough, said bores and bolts being positioned to maintain said base portion in tight engagement with said mixing drum, preventing ingress of concrete material therebetween.

* * * * *